United States Patent [19]

Mauer

[11] Patent Number: 5,478,051
[45] Date of Patent: Dec. 26, 1995

[54] BELT PROVIDING CONTINUOUS LINING UP OF PLASTICS COMPONENTS

[75] Inventor: Dieter Mauer, Lollar, Germany

[73] Assignee: Emhart Inc., Newark, Del.

[21] Appl. No.: 154,649

[22] Filed: Nov. 18, 1993

Related U.S. Application Data

[62] Division of Ser. No. 857,021, Mar. 24, 1993, abandoned.

[51] Int. Cl.$^6$ ................................................. B29D 29/00
[52] U.S. Cl. ......................... 264/156; 264/154; 264/167; 264/251; 264/254; 264/297.2
[58] Field of Search ......................... 29/430, 809, 468; 206/343; 264/154, 156, 251, 254, 297.2, 167

[56] References Cited

U.S. PATENT DOCUMENTS 4,008,302  2/1977  Erlichman ................. 264/156

FOREIGN PATENT DOCUMENTS

| 0128016 | 2/1988 | European Pat. Off. . |
|---|---|---|
| 0326529 | 8/1989 | European Pat. Off. . |
| 0364426 | 4/1990 | European Pat. Off. . |
| 2829566 | 1/1979 | Germany . |
| 2737602 | 3/1979 | Germany . |
| 3446142 | 6/1985 | Germany . |
| 745639 | 7/1980 | U.S.S.R. . |

OTHER PUBLICATIONS

Patent Abstract of Japan M–372 Apr. 17, 1985 Abstract of JP 59–214525.

*Primary Examiner*—Joseph M. Gorski
*Attorney, Agent, or Firm*—E. D. Murphy

[57] ABSTRACT

A belt providing continuous lining up of plastics components held in a plastics web whereby components successively presented to an assembly position are then separated and utilized, having at least one guide element provided on each component whereby the component is located and positioned at the assembly position prior to separation of the component.

8 Claims, 6 Drawing Sheets

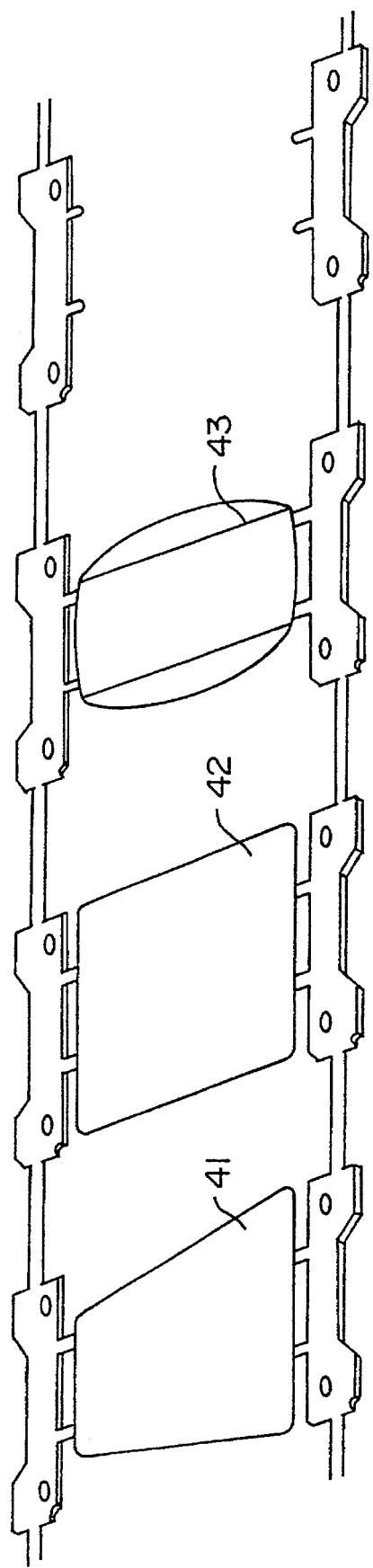

BELT PROVIDING CONTINUOUS LINING UP OF PLASTICS COMPONENTS

This is a division of application Ser. No. 07/857,021 filed on Mar. 24, 1993 and now abandoned.

BACKGROUND OF THE INVENTION

The invention relates to a belt providing continuous lining up of plastics components which are attached to one another by means of a lateral thread extending on the plastics components such that, during conveyance of the belt, one plastics component after another reaches an assembly position in which the plastics component is separated from the belt.

Belts for the lining up of components have already been widely used, more specifically where a large number of components are to be processed repeatedly at an assembly position. In this case, the belt forms an advantageous aid for the automatic conveyance of the components to the assembly position in which the components are then separated from the belt and processed according to their respective application.

It is also known to leave pressed parts which have been punched out from a sheet metal strip on the remaining part of the sheet metal strip by means of crosspieces and to use this remaining part as a type of belt for conveyance so that the pressed parts attached to it can be brought successively into the assembly position by the conveyance of the sheet metal strip and can then be processed after they have been separated from the sheet metal strip (see German Gebrauchsmuster G 83 36 724.1). The use of the sheet metal strip complicates the conveyance thereof as considerable flexibility of a belt is usually necessary for this purpose in order to lead it, for example, on the conveying path via deflecting wheels and/or rollers.

A method is described in DE-OS 25 12 825 for the supply of screws or the like by means of a belt, in which the individual screws are transported at uniform intervals on a belt provided with claws. The belt consists of flexible plastics material and is provided with prefabricated pockets into which the screws are pressed using a gripping action of the pockets. For this purpose, the screws are initially arranged so that they can be grasped in the same location from which they are then pressed into the pockets. In the assembly position, the screws are then pressed out of the pockets and used according to their application.

It is also known from DE-OS 36 03 402 to join together pins which can be used as dowels, by means of a belt or by means of two strings, the belts or the strings extending transversely over the contiguous pins and being connected to the pins by adhesive points at the contact sites. In the assembly position, the individual pins can be separated from the belt or the strings and can be processed, for which purpose the belt can be supplied to a corresponding insertion device.

The lining up of components on belts has already been utilised in electrical engineering in that electrical elements which are to be inserted into electric circuits are arranged on belts which are then guided to an insertion tool where, in an assembly position, the individual electrical components are successively removed from the belt and inserted into a plate carrying the respective circuit (see, for example, DE-OS 25 51 364). There are various methods of connecting the electrical components to the belt. The components can be inserted in pockets in the belt, but they can also be fastened adhesively on the belt (see German Gebrauchsmuster G 88 03 425.9).

Plastics parts have also already been lined up on belts. Thus, DE PS 29 44 314 shows lined up sealing rings of flexible material which, during moulding of the sealing ring, are provided with crosspieces which extend to the next respective ring so that a line-up of plastics rings consisting of the same plastics material is formed, in whicn the sealing rings and the crosspieces connecting them form the belt. In the assembly position, the foremost respective sealing ring is broken away and processed. A similar method of lining up plastics parts is disclosed in DE-OS 24 15 958, which shows a ladder-like belt of which the individual rungs are used as label holders after being separated. With this embodiment also, each plastics component formed by a rung is continuously injection moulded with the external spars so that the belt directly containing the plastics components is formed in one operation.

Reference is finally made to EP-A 386 424 which discloses a belt, described as a magazine, with plastics bushes which serve for insertion of screws to be conveyed by the belt. The belt is formed by two strings which extend continuously over the lined up plastics bushes and penetrate them at opposing sites. The plastics bushes are shaped individually in succession, the strings simultaneously being inserted so that a continuous belt can be produced. The plastics bushes can be used as washers during the processing of the screws. In the assembly position, the strings are severed and the foremost plastics bush is processed with the screw.

When considering the aforementioned state of the art relating to plastics components, it can be seen that it invariably deals with relatively simply shaped plastics components which are unproblematical for intermittent conveyance of the belt lining up the plastics components. It is an object of the invention continuously to line up plastics components of complicated design in a belt and also to ensure exact stepwise conveyance to an assembly position with exact positioning.

BRIEF DESCRIPTION OF THE INVENTION

According to the invention, this is achieved in that at least one guide element which can be grasped during conveyance of the belt is moulded integrally on each plastics component such that during the moulding of plastics component and guide element, one or more threads are moulded on the guide element, plastics component and guide element being connected via at least one crosspiece which can be disconnected in the assembly position, in which the plastics components is held in a defined manner by means of the guide element.

Owing to the design of the belt with guide elements which can be grasped during conveyance and threads which connect the guide elements, the plastics components connected to the guide elements via the crosspieces can be kept clear of any direct intervention during conveyance of the belt, e.g. they can hang freely in a conveyor as the conveying function concentrates on the guide elements and the exact positioning of the plastics components in the assembly position can be achieved by the guide elements, which form the contact site for the corresponding members of the conveyor during conveyance and positioning. The plastics components attached to the guide elements can have virtually any complicated design as they do not have to be grasped either during conveyance or during positioning. Therefore the conveyor does not have to allow for the design of the plastics components and can thus be standardised for quite different plastics components. Owing to their exact positioning in the assembly position, it is possible to separate the plastics component directly from the belt in the region of the crosspieces using a setting tool adapted to the respective plastics component and to insert and fasten it in any module or work piece.

As a large number of plastics components is used for example in the assembly of cars, including holders for pipes, ornamental strips and the like, the belt according to the invention is particularly suitable for use in the car industry where a plurality of operations is carried out by robots on the car which is being built. Owing to the complicated shaping of the plastics components used, it used to be difficult to insert them automatically, for example out of a magazine, as, on the one hand, the combination of different plastics components in a magazine is conditional on the automatic alignment thereof by a sorter and conveyance was always difficult, especially removal from the magazine, and consequently large numbers of plastics components have had to be inserted by hand. The sorting of the plastics components to be located in the correct combination in a magazine is also problematic as plastics components with complicated shaping are difficult to align automatically, as compared, for example with screws, which, when attached by their heads, can be sorted and aligned without difficulty. These problems are solved when using the belt according to the invention as, with it, the continuous correctly located lining up of plastics components takes place in the mould which allows production of the belt by shaping of the threads on the guide elements during moulding. The continuous lining up of the plastics components into a belt therefore takes place in a single manufacturing step directly during production of the individual plastics components so that, after moulding of the plastics components, they can be delivered within the resultant complete belt, rolled up into virtually any size of rolls for processing—in particular in the car industry—where they can then be transferred directly to a robot provided with a conveyor. Owing to the guide elements available in the belt, the conveyors, as mentioned above, can have substantially standardised sizes as the plastics components attached to the guide elements do not themselves influence the conveyor at all.

The incorporation, proposed in EP-A 386 424, of strings forming the belt into the plastics components penetrated by the strings is intentionally avoided in the belt according to the present invention. In fact, strings inevitably weaken the plastics components and impair the free design thereof. Furthermore, this is also impaired in the lined up sealing rings according to DE-PS 29 44 314 because the crosspieces forming the belt fix directly on the sealing rings. The actual belt formation with the lining up of the plastics components, according to the present invention, apart from the crosspieces between the guide elements and the plastics components, does not affect the plastics components, and so complete freedom of design results. Said crosspieces, which are detached in the assembly position, are not aggravating because they can be placed directly at sites of the plastics components where they do not form an obstruction aster they have been severed, for which purpose the guide elements afford the space desired for the shaping of the crosspieces. For the severing operation, the conveyors grasping the guide elements provide a direct abutment which has to be created and provided on component 5 itself for the severing of the components according to DE-PS 26 44 314 and EP application 386 424, and this can be difficult, especially with components of complicated design.

For the formation of the belt, one guide element per plastics component is basically sufficient, and only one thread which extends to the side of the plastics components and connects respective successive guide elements is then provided. During the conveyance of a belt constructed in this way, it should merely be ensured that the respective conveyor comprises the successive guide elements such that these guide elements can be moved by the conveyor only in the conveying direction without being able to slide from any rails or the like provided with conveyance. To counteract any twisting of the thread, two spaced threads which provide greater resistance to twisting can be provided instead of a single thread. However, it is also possible and beneficial, with plastics components which are heavier or complicated in make-up, to attach the plastics components to one another via two opposing threads in the belt, the threads being attached to opposing guide elements. In this case, two threads, by means of which the guide elements arranged on both sides of the plastics components are connected to one another, extend laterally next to the plastics components in the longitudinal direction of the belt. In this case, the plastics components are guided particularly reliably in a conveyor.

Depending on the size and weight of the respective plastics component, this plastics component can be connected via a single crosspiece or also via several crosspieces to the associated guide element. With longer plastics components, it is often beneficial to connect each guide element via at least two crosspieces as, in this case, the plastics component cannot twist relative to the respective guide element round the axis of a crosspiece. The external shape of the guide elements can be used for the exact positioning of the guide elements and therefore of the plastics components. Particularly exact and simple positioning is achieved, however, it the guide elements are provided with positioning bores in which exact positioning can be achieved in the assembly position by projecting locating pins.

As the belt normally has to be guided around conveying wheels or conveying curves during conveyance of the belt, owing to the virtually continuous extension thereof, the guide elements are expediently shaped so thinly that they can be suitably bent during conveyance of the belt.

Owing, in particular, to the friction relative to guide channels, the guide elements can be provided, at their ends, with noses which project on both sides and penetrate into the guide channels, producing a small guide face.

A continuous thread which enters the mould for shaping plastics component and guide element and then extends continuously along the belt is shaped in the guide element during the moulding of plastics component and guide element can be used as a thread.

However, it is also possible to mould the thread one-sidedly on the guide element in the direction toward the guide element following the belt when moulding plastics component and guide element, the thread shaped in this way ending in a holding part which is surrounded during the moulding of the following guide element and is surrounded by it during the moulding thereof. In this case, the holding part does not show from the exterior as it is enclosed in a guide element. However, it is also possible to place the holding part between two guide elements where it is surrounded by the respective end of the thread of the following respective guide element during moulding. It is beneficial to use the same material for the threads as for the plastics components and the guide elements as this simplifies recycling of waste materials.

During the moulding of plastics components in the guide element, one respective individual pair of these parts can be shaped in one moulding operation, but it is also possible and beneficial for economic production to mould a plurality of plastics components forming a group, with their guide elements and the threads in each case. The plastics components within the group may be identical but it is also possible to combine different plastics components in one group.

The invention also relates to a method of applying the plastics components to a workpiece in which the plastics components in a belt are supplied according to the foregoing statements. This method is expediently carried out such that the plastics components are supplied in succession to a setting tool and are brought into an assembly position by means of the respective guide elements, whereupon the setting tool separates the plastics component, which is to be set, from the belt and places it on the workpiece in one course of movement.

BRIEF DESCRIPTION OF THE DRAWINGS

In order that the present invention can be better understood, preferred embodiments will now be described in greater detail by way of example with reference to the accompanying draws in which:

FIG. 6 shows a group of three different plastics components.

DETAILED DESCRIPTION OF DRAWINGS AND PREFERRED EMBODIMENTS

Figure 1:
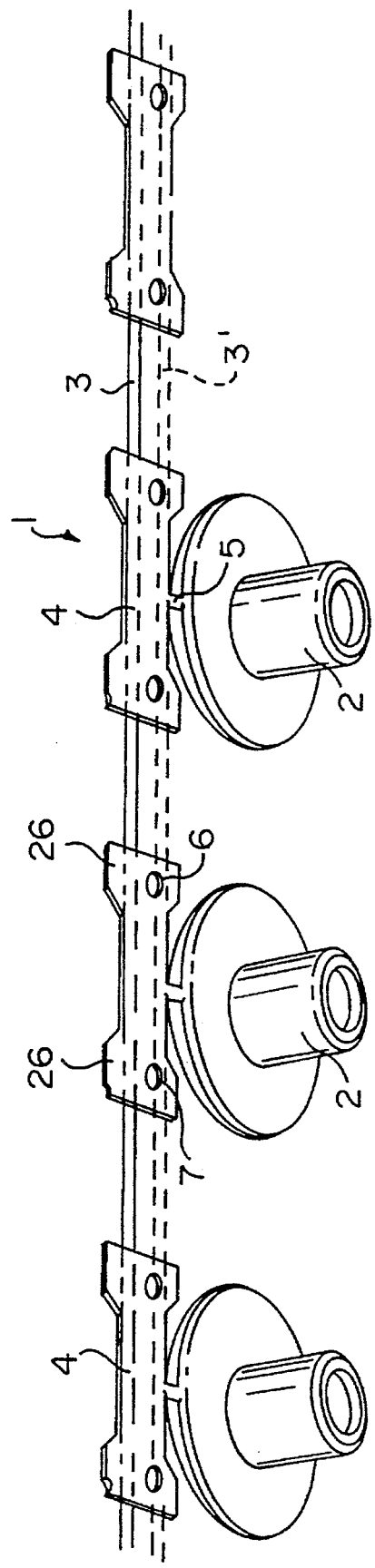
FIG. 1 shows a belt with a continuous thread and only one guide element per plastics component.

FIG. 1 shows a belt 1 with a plastics components 2 which are attached to it and are formed by push-buttons in this case. The belt 1 is formed by continuous thread 3 which passes through guide elements 4 to which the plastics parts 2 are attached via crosspieces 5. Plastics part 2, guide element 4 and crosspiece 5 are moulded in one operation, in particular by injection moulding in an injection mould, the thread 3 which is surrounded by the guide element 4 and is therefore moulded thereon being guided through the injection mould such that it is integrally connected to the guide element 4 in practice. The thread is thus formed from the same material as that of the plastics component 2. However, a cord, a string or a strap can be used as thread 3. A second thread 3' (shown in broken line) which is spaced from the first thread 3, can be provided to increase the resistance to twisting.

During the conveyance of the belt 1, the guide elements 4 are guided in a conveyor (further details of which will be given below in conjunction with FIG. 4), the plastics components 2 being entrained via the crosspieces 5. The guide elements 4 allow direct intervention of grippers without the grippers having to come into contact with the plastics components 2. For the exact positioning of the plastics components 2 at the site of an assembly position (further details of which will be given in conjunction with FIG. 4), positioning bores 6 and 7 are provided for each guide element 4 and are engaged in the assembly position by pins provided in the conveyor, suitably accurate positioning of the guide element 4 and therefore of the respective plastics component 2 being possible as these pins can be located exactly.

Figure 2:
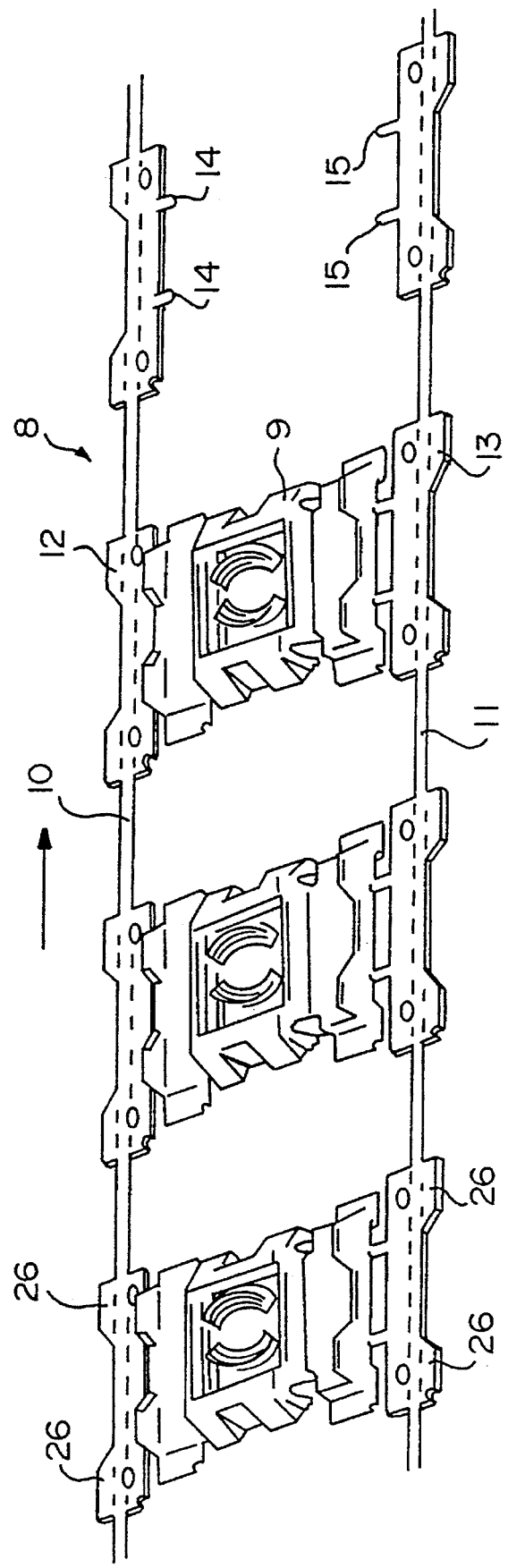
FIG. 2 shows a belt with two continuous threads and two guide elements per plastics component.

FIG. 2 shows a belt 8 in which two continuous threads 10 and 11, which each pass through two guide elements 12 and 13 provided next to plastics component 9, are provided laterally next to the plastics components 9, which in this case are ornamental strip clips. Owing to this design of belt 8, the plastics components 9 are guided particularly reliably. For each guide element 12 and 13, they are connected in each case via two crosspieces 14 and 15 to the respective plastics component 9 which is therefore given a precise reference position relative to the guide elements 12/13. The three plastics components 9 illustrated can be injection moulded in one operation as a group together with their guide elements 12, 13 and threads 10, 11.

In FIGS. 1 and 2, the respective conveying direction of the belt 1 or 8 is indicated by the sketched arrow. Furthermore, the respective plastics component 2 or 9 is omitted in the last (right-hand) position in the two Figures. It is separated from the belt 1/8 at this site by detaching the crosspieces 5 or 14/15 and is then subjected to further processing.

Figure 3:
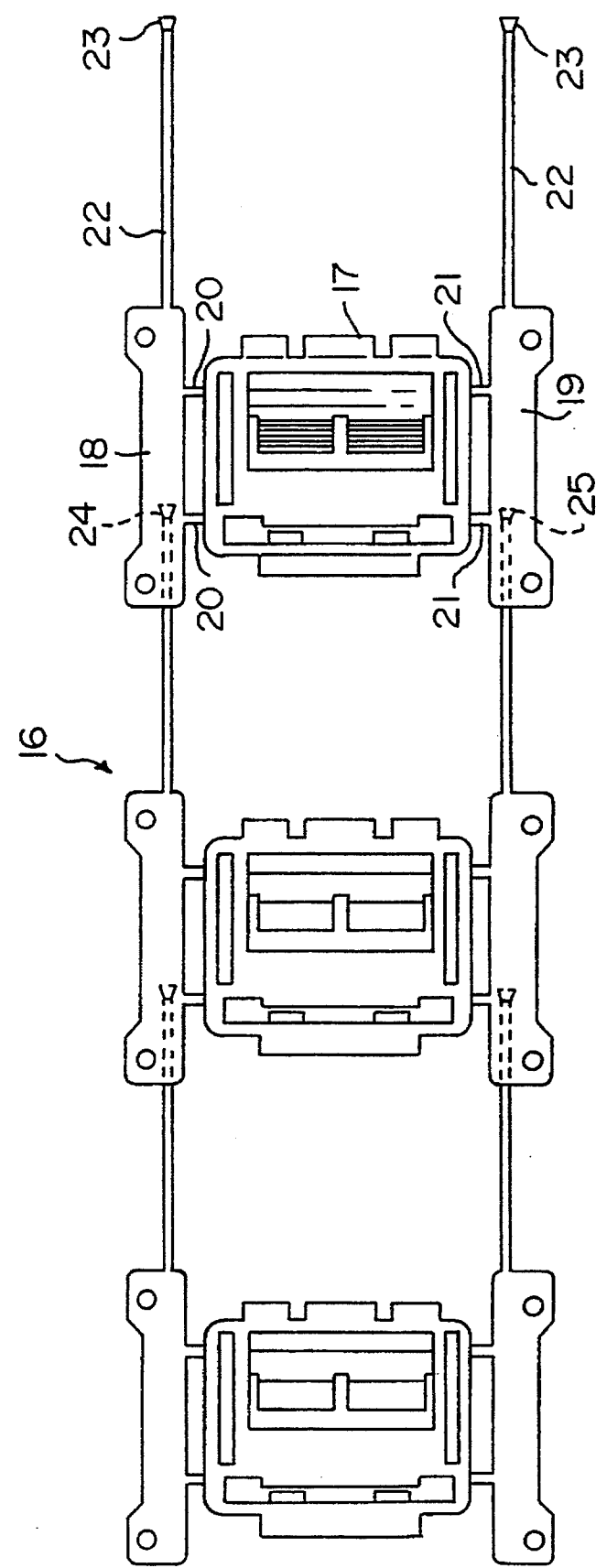
FIG. 3 shows a belt with two guide elements per plastics component and respective holding parts, shaped into the guide elements, for the threads.

FIG. 3 shows a belt 16 in which the individual plastics components (a different ornamental strip clip in this case) are carried laterally by two respective guide elements 18 and 19, as in the embodiment in FIG. 2. The connection between the guide elements 18 and 19 and the respective plastics component 17 is provided by the crosspieces 20 and 21.

A piece of thread 22 which is injection moulded onto the guide element 18 and ends in the holding part 23 constructed as a thickened region is provided here to form the thread between guide elements 18 and 19. The holding part 23 is shaped into the respective following guide element 18/19, as shown at 24/25, during the step-wise shaping of plastics component 17 with guide element 18/19.

The following procedure is adopted when shaping the design illustrated in FIG. 3: assuming that the mould is intended for only one plastics component 17, the plastics component 17 illustrated in thick lines together with the crosspieces 20/21, the guide elements 18/19 and the pieces of thread 22 with holding part 23 are shaped in one injection moulding operation, whereupon, after opening the mould, the plastics component 17 with its moulded parts is shifted into the position shown in thin lines, in which the holding part 23 passes into the location designated by 24 or 25. A further injection moulding operation, during which the identical parts are shaped, as already described, takes place at this location, the end of the piece of thread 22 with the holding part 23 being moulded into the two guide elements 18 and 19. A connection is thus produced which progresses from one holding part to another and forms the belt 16.

The guide elements 4 or 12, 13 or 18, 19 shown in FIGS 1 to 3, have projecting noses 26 which are supported opposite corresponding guide rails in a conveyor and, owing to their design, reduce the friction in the rails.

Figure 4:
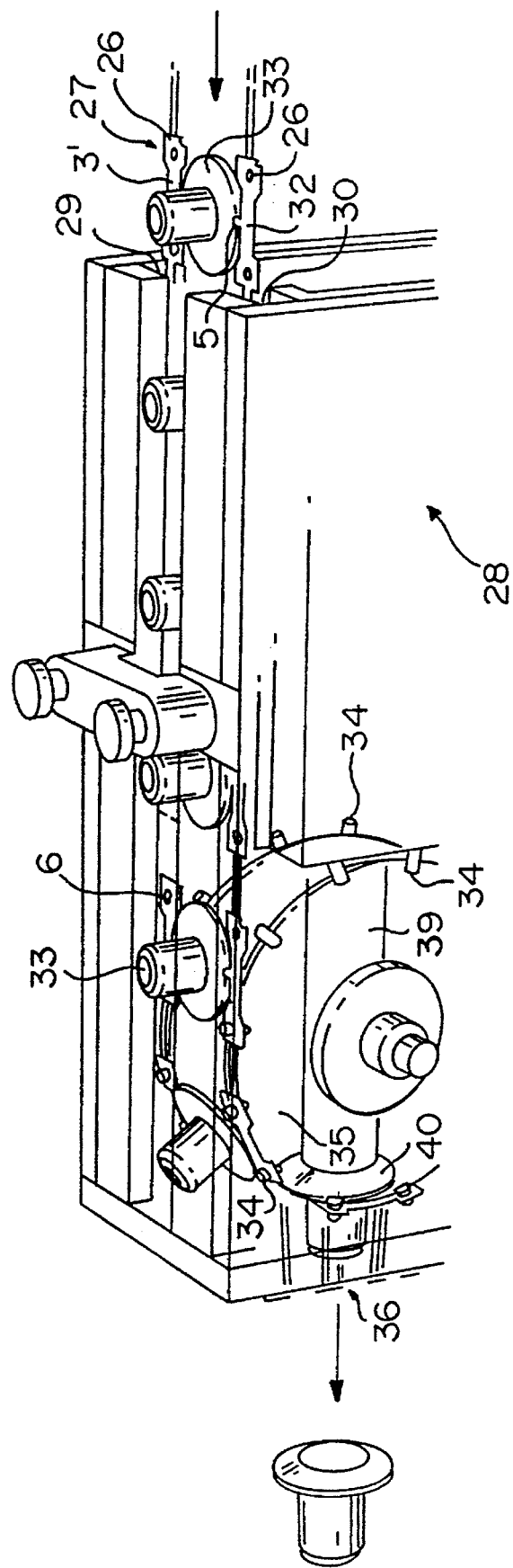
FIG. 4 shows a conveyor with a belt laid therein.

FIG. 4 shows a basic diagram of a belt 27 which is guided in the conveyor 28 with the two conveying channels 29 and 30. The guide elements 31 and 32 of the individual plastics components 33 slide in these conveying channels 29 and 30. The plastics components 33 are moved forwards step-wise by engagement of the transporting pins 34 with the conveying wheel 35 by engagement in the positioning bores 6 of the guide elements 31 and 32 and, during the movement of the belt 27, (indicated by the sketched arrows) push the plastics components 33 forwards exactly by one step in each case without coming into contact with the plastics components 33.

It can be seen that belt 27 is bent round conveying wheel 35 so that it passes into assembly position 36. The belt 27 can follow this bend directly by being given suitable flexibility by the threads and guide elements described in conjunction with FIGS. 1 to 3. In assembly position 36, plastics component 40 located in this position is cut away at its crosspieces 5 and ejected by ejector 39, which is shown here only in principle. The plastics component located in the assembly position Is then grasped by a robot gripper and is fastened, for example, on a vehicle body by it after suitable movement.

Figure 5:
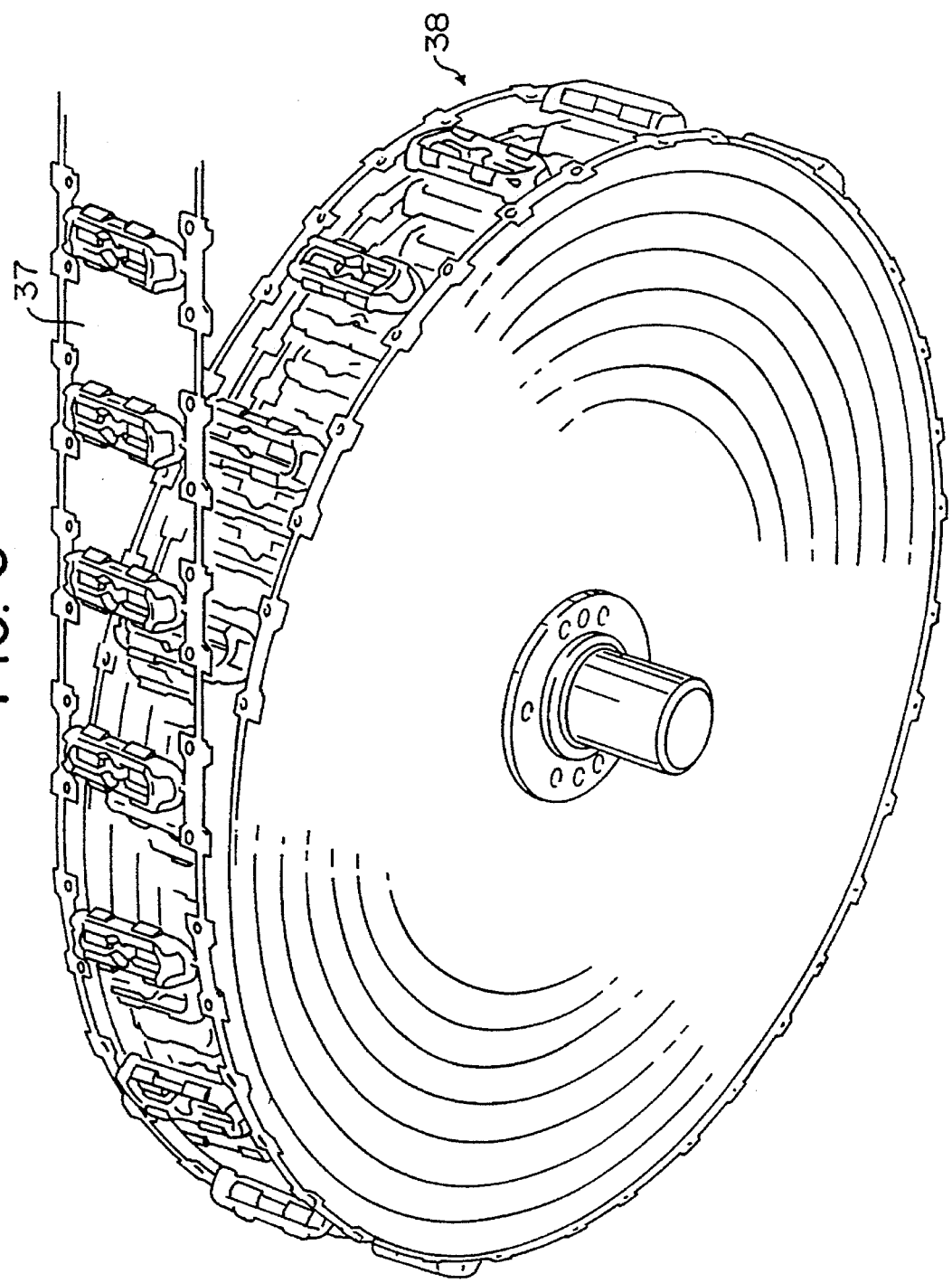
FIG. 5 shows a belt rolled up into a coil.

Owing to its flexibility, the belt according to the invention can be rolled together directly into coils. This is shown in FIG. 5. In this case, the belt 37 forms coil 38 which can be packed in this form, for example in a box, and can be transported. The coil 38 is then unwound in the opposite direction for assembly. Such coils can perfectly well be given lengths of many metres.

FIG. 6 shows a group of three differently designed plastics components 41, 42 and 43 which are shaped in one operation together with their associated guide elements and threads. During removal of these plastics components in the assembly position, a plastics component adapted for the respective application is available in the assembly position for this application. It is assumed that the components 41, 42 and 43 are required in the sequence in which they succeed one another in the belt, during assembly of the plastics components 41, 42 and 43. The same group then necessarily follows such group of three different plastics components in the belt and so on.

We claim:

1. A method of manufacturing an elongated belt including sequentially located component parts for delivery to a installation point comprising the steps of:
   a. providing a thread of a selected moldable material;
   b. presenting a segment of said thread at a molding station;
   c. in a single step, molding a component part, a guide element having location-determinative means on said guide element, and a crosspiece interconnecting said component part with said guide element at said molding station, said part, said element and said crosspiece being formed of a material compatible with said thread; wherein said molding step includes molding said element over a portion of said thread segment so that said portion becomes integral therewith; wherein said molding step further includes forming said location-determinative means on said guide element simultaneously with the molding of said component part, said guide element and said crosspiece, thereby defining an exact positional relationship between said location-determinative means and said component part; and
   d. advancing said thread, thereby presenting a new segment at said molding station.

2. A method as claimed in claim 1 wherein each of said thread segments comprise a part of a continuous thread.

3. The method as claimed in claim 1, wherein said step of forming said location-determinative means includes the step of forming a plurality of location-determinative means on said guide element during said molding step.

4. The method as claimed in claim 1, wherein said step of molding the guide element includes the step of forming said guide element in an elongated shape with its longest dimension extending along the axis of said thread.

5. The method as claimed in claim 4, wherein said step of forming said location-determinative means includes the step of forming at least one location-determinative means near each end of said elongated guide element.

6. The method as claimed in claim 4, wherein said step of molding the guide element includes the step of forming said guide element with a cross-sectional dimension perpendicular to said thread, said dimension being sufficiently small to enable flexing of said guide element in the longitudinal direction of said thread.

7. The method as claimed in claim 1, wherein said step of molding the guide element includes the step of forming said guide element with rounded corners on at least one end thereof.

8. The method as claimed in claim 1 and further comprising the steps of:
   providing a second thread; and
   presenting a segment of said second thread at said molding station; wherein said molding step includes molding another guide element on each said thread segment of said second thread, and molding said component part between said guide elements with said component part being interconnected to each of said guide elements by a crosspiece.

* * * * *